(No Model.)

R. L. ELLERY.
RUNNING GEAR FOR VEHICLES.

No. 484,186. Patented Oct. 11, 1892.

Witnesses:
Inventor,
Robert L. Ellery
by his attorneys

UNITED STATES PATENT OFFICE.

ROBERT L. ELLERY, OF TAUNTON, MASSACHUSETTS, ASSIGNOR OF ONE-HALF TO FRANCIS E. FULLER, OF SAME PLACE.

RUNNING-GEAR FOR VEHICLES.

SPECIFICATION forming part of Letters Patent No. 484,186, dated October 11, 1892.

Application filed December 26, 1891. Serial No. 416,155. (No model.)

*To all whom it may concern:*

Be it known that I, ROBERT L. ELLERY, of Taunton, in the county of Bristol and State of Massachusetts, have invented a new and useful Improvement in Vehicles, of which the following is a specification, reference being had to the accompanying drawings, in which—

Figure 1:
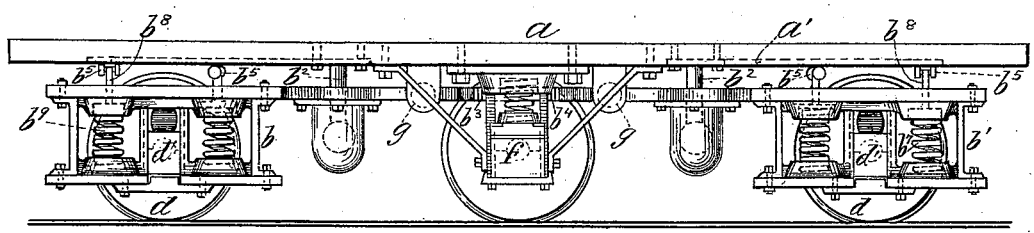
Figure 2:
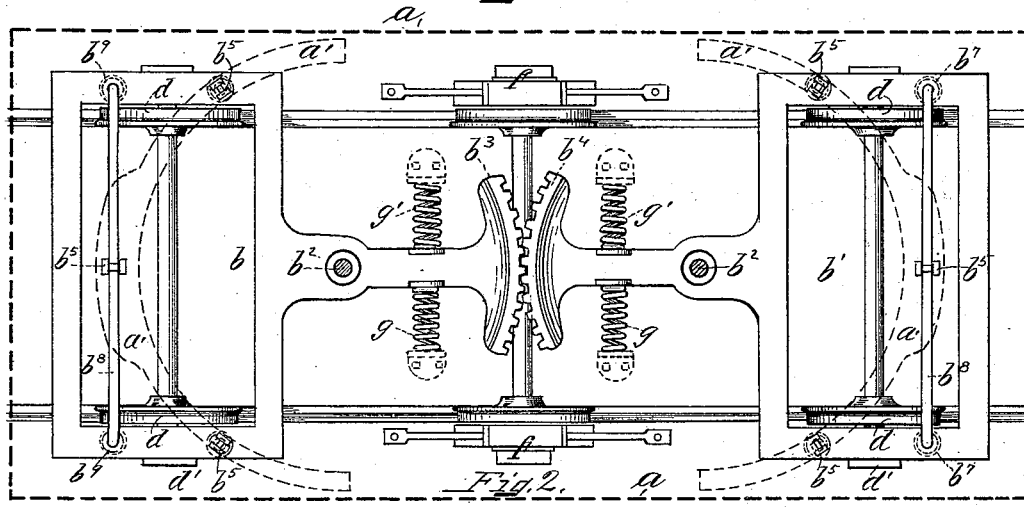
Figure 3:
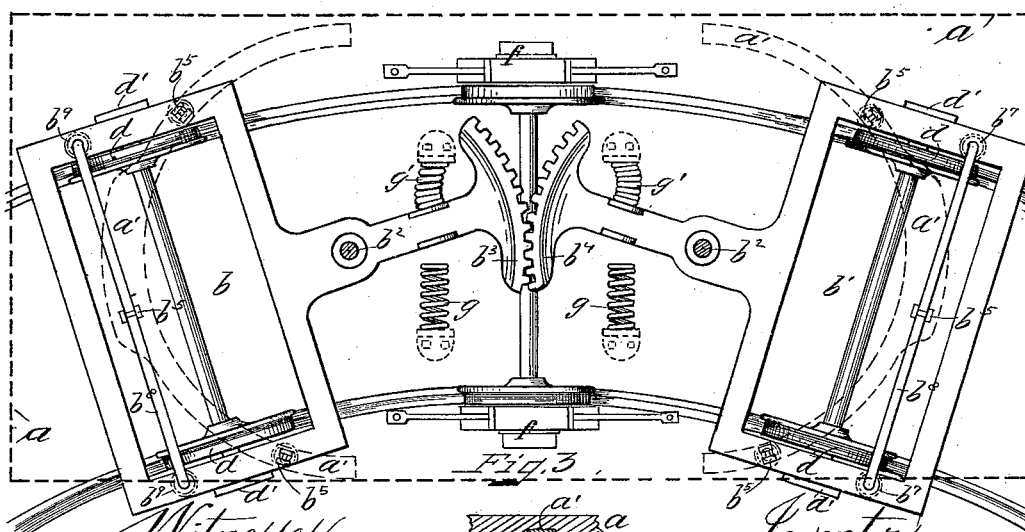

Figure 1 is a side elevation of so much of a vehicle as is necessary to illustrate one form of my invention. Fig. 2 is a top plan showing the vehicle on a straight track, the king-bolts being sectioned. Fig. 3 is a similar plan showing the vehicle on a curved track. Fig. 4 is a sectional detail showing a spring-supported stud carrying a roll which runs on a track on the car-body.

My invention is more especially intended for vehicles which run on rails, but may be embodied in vehicles intended for use on ordinary roads; and my invention consists, primarily, in the combination of a vehicle-body with front and rear two-wheeled trucks, each pivoted by its own king-bolt to the body at a point which causes the axle to move endwise when the truck swings on its bolt and connected independently of a middle truck, as by segment-gears or the like, so that a swing of one two-wheeled truck on its king-bolt will cause a reverse swing of the other two-wheeled truck on its king-bolt—that is, when the vehicle travels about a curve the front truck not only swings on its king-bolt, but its axle also moves endwise across the body, and this motion of one truck compels without the intervention of a middle truck a like motion of the other truck, but in such a direction that the axles radiate from a common center.

In the drawings, showing the best mode which I have contemplated of applying the principle of my invention, $a$ is a part of a vehicle-body. (See Figs. 1, 2, and 3.) The outline of the body is indicated by dotted lines. The trucks $b\ b'$ to carry the vehicle-supports $d$, which are in this case wheels fast to axles. The trucks $b\ b'$ are pivotally connected to body $a$ in such wise as to swing in relation to body $a$ by king-bolts $b^2$. These pivotal connections are so placed with relation to the axle or a line joining the wheels $d$ that when the truck swings on the king-bolt $b^2$ the axle moves endwise, as clearly shown in Fig. 3. The trucks $b\ b'$ are connected together by any suitable means for compelling them to work together, and the means preferably employed for this purpose are segmental gears $b^3\ b^4$, one connected to each truck. Wheels $d$ are in this case mounted in boxes $d'$, carried by the trucks $b\ b'$, as usual. It will now be seen that when one set of wheels $d$ passes from a straight path to a curved one the truck for that set swings on its bolt $b^2$, giving the wheels $d$ a sidewise movement in relation to the car-body, as shown in Fig. 3—that is, the gear $b^3$ on truck $b$ swings and as it works with the other gear $b^4$ swings the other truck $b'$ and wheels $d$ to suit the curvature of the path. Were the trucks $b\ b'$ pivotally connected to the car-body at the middle of the axle and not at one side thereof, substantially as shown, the axle would not move endwise, as shown in Fig. 3, and the consequence would be that the vehicle could not move in a path so sharply curved as the path which vehicles embodying my invention will take. In other words, vehicles embodying this main feature of my invention will run in more sharply-curved paths than any vehicles heretofore constructed, so far as I know.

I indicate an intermediate truck $f$, as that is commonly used upon street-railway cars; but its construction is too well known to require description, and it has no necessary relation to my invention, except when the front and rear trucks $b\ b'$ are both made in accordance with my invention, and in that case this middle truck $f$ and its wheels act to bring the trucks $b\ b'$ back to the position shown in Fig. 2, where the vehicle gets in a straight track, for the flanged wheels on truck $f$ cause the car-body to come in line with the straight track, and thereby force is applied through the king-bolts $b^2$ to line up the trucks $b\ b'$. Were this middle truck $f$ omitted suitable springs or the like would be required to line up the trucks $b\ b'$ with the straight track, as indicated in the drawings, where $g\ g'$ are compression-springs, with one abutment of each fast to the car-body, so that one or the other spring is under tension whichever way the truck swings with relation to the car-body. These springs $g\ g'$ are not essential when the middle truck and the segment-gears (or equivalent devices for connecting the trucks $b$ $b'$ so that they will swing together) are used; but if the middle truck be omitted these springs or their equivalents for bringing up the trucks $b$ $b'$ are necessary whether the segment-gears be used or not.

As shown, the body $a$ is provided with a curved plate $a'$, affording a bearing-surface for the friction-rolls $b^5$, mounted on yielding studs $b^6$, carried by the trucks, the outer springs $b^7$ of the end trucks being connected by braces $b^8$.

I am aware of Snyder's patent, No. 11,337, dated July 18, 1854, and disclaim all that is shown in it. The main difference between my contrivance and Snyder's is that Snyder's front and rear trucks can swing each on its king-bolt only when the middle truck is moved across the body of the vehicle, for in Snyder's contrivance the front and rear trucks are pivoted to the middle truck and connected solely by the middle truck, while in my contrivance the middle truck has nothing to do with connecting the front and rear trucks, but it is fast to the body and cannot move across the body.

What I claim as my invention is—

1. In a vehicle, front and rear two-wheeled trucks, each pivoted to the vehicle-body by its king-bolt at one side of a line joining its wheels, connecting mechanism, substantially such as described, and springs for lining up the trucks, all combined and operating substantially as and for the purposes specified.

2. In a vehicle, front and rear two-wheeled trucks, each pivoted to the vehicle-body by its king-bolt at one side of a line joining its wheels, a middle truck fast to the vehicle-body, and connecting mechanism, substantially such as described, between the front and rear trucks and independent of the middle truck, all combined and operating substantially as and for the purposes specified.

ROBERT L. ELLERY.

Witnesses:
J. MAYNADIER BROWNE,
J. E. MAYNADIER.